No. 798,233. PATENTED AUG. 29, 1905.
A. TRIEBE.
TRAP.
APPLICATION FILED FEB. 23, 1905.
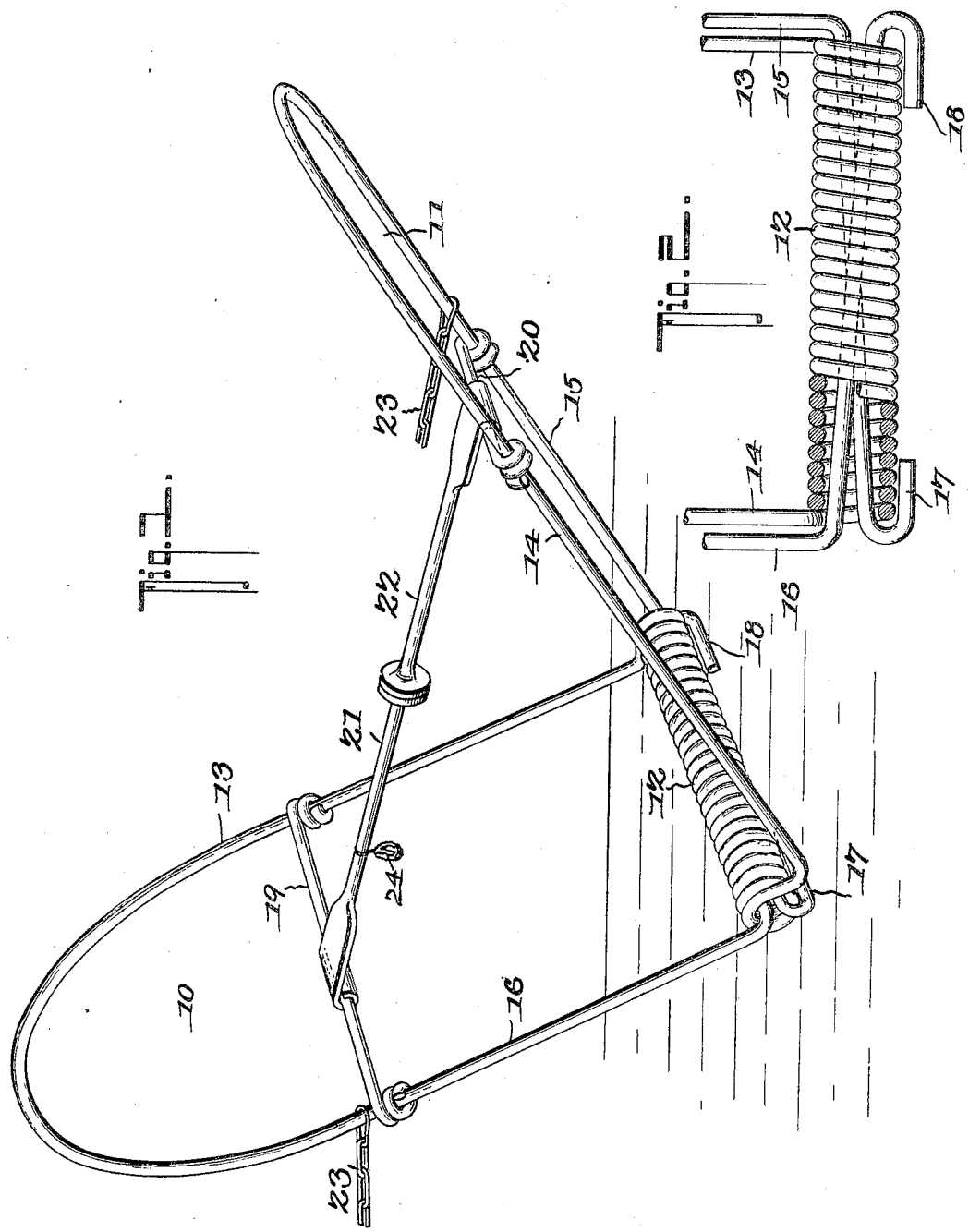
Witnesses
E. J. Stewart
C. N. Woodward
Alfred Triebe,
Inventor.
by CA Snow & Co
Attorneys

UNITED STATES PATENT OFFICE.

ALFRED TRIEBE, OF TUNIS MILLS, MARYLAND, ASSIGNOR OF ONE-HALF TO OLLIE M. PROUSE, OF TUNIS MILLS, MARYLAND.

TRAP.

No. 798,233.     Specification of Letters Patent.     Patented Aug. 29, 1905.

Application filed February 23, 1905. Serial No. 246,947.

*To all whom it may concern:*

Be it known that I, ALFRED TRIEBE, a citizen of the United States, residing at Tunis Mills, in the county of Talbot and State of Maryland, have invented a new and useful Trap, of which the following is a specification.

This invention relates to animal-traps, and has for its object to simplify and improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved trap in distended position. Fig. 2 is a sectional detail view, enlarged, illustrating the construction of the spring portion of the device.

The improved device comprises two frame members in the form of oblong loops, (represented as a whole respectively at 10 and 11,) with a spring-coil 12 connecting the loops at one end for maintaining the same yieldably compressed against each other face to face, and thus produce the requisite "grip" of the trap. The spring-coil is arranged between the diagonally opposite side members 13 14 of the loops, while the free ends of the side members 15 16 of the other loop are passed longitudinally through the coil in opposite directions with the terminals "clenched" around the opposite ends of the coil, as at 17 18. By this means it will be obvious that the force of the spring is exerted to maintain the loops firmly compressed against each other face to face and will correspondingly compress any object which may be caught between them.

The structure thus far described forms the body of the trap and is very simple in construction, can be inexpensively manufactured, and is made from a single piece of resilient wire, as will be noted.

The side members 13 16 of the loop-frame 10 are connected by an intermediate transverse stay-bar 19, and the side members 14 15 of the loop-frame 11 are similarly connected by an intermediate transverse stay-bar 20. Swinging from the stay-bars 19 20 are trigger members 21 22, adapted for engagement end to end, as shown in Fig. 1, when the frame members are distended and support them releasably in that position. The trigger members will thus hold the trap in set position, and a slight pressure applied to the trigger member from either side will spring the trap and catch the animal between the spring-operated frame-loops.

In setting the trap it will preferably be concealed except the line of access to the trigger member, so that an animal approaching the trap will be certain to spring the same, and by reason of the form of the loop-frames and the location of the trigger members the animals will be caught by the neck or around the body, and thus either instantly killed or so badly injured as to die very quickly.

Chains 23 or other means of fastening the trap to stakes, clogs, or similar fastening devices or supports may be employed when required.

In catching some forms of animals suitable bait may be attached to one or both of the trigger members, as represented at 24.

The improved trap may be constructed of any required size for trapping different sizes or species of animals, as the device is adapted equally for all sizes of animals.

Having thus described the invention, what is claimed is—

1. In an animal-trap, a frame formed from a single piece of wire and comprising two loops located face to face when closed, with one side member of one of said loops connected by a spring-coil to the diagonally opposite side member of the other loop and with the free ends of the remaining side members passed reversely through said spring-coil and clenched over its opposite ends, in combination with a trigger means for maintaining said frame members releasably in distended position.

2. In an animal-trap, a frame formed from a single piece of wire and comprising two loops located face to face when closed, with one side member of one of said loops connected by a spring-coil to the diagonally opposite side member of the other loop and with the free ends of the remaining side members passed reversely through said spring-coil and clenched over its opposite ends, transverse bars respectively connecting the spaced sides of said frame members, and trigger members swinging from said transverse members for engagement end to end to maintain said frame members releasably in distended position.

3. In an animal-trap, two frame members formed of wire loops connected at one end by a spring for maintaining the same yieldably in position face to face, bars connected transversely of said frame-loops, and trigger members swinging from said bars for engagement end to end to maintain said frame-loops releasably in distended position.

In testimony that I claim the foregoing as my own I have hereto affixed my signature in the presence of two witnesses.

ALFRED TRIEBE.

Witnesses:
    THOMAS H. TRIPPE,
    WILLIAM GRACE.